(12) United States Patent
Wakiyama et al.

(10) Patent No.: US 10,419,637 B2
(45) Date of Patent: Sep. 17, 2019

(54) IMAGE PROCESSING APPARATUS AND NON-TRANSITORY COMPUTER READABLE MEDIUM INCLUDING CHANGE OF AN IMAGE PROCESSING UNIT AFTER PERFORMANCE OF A ROTATION

(71) Applicant: FUJI XEROX CO., LTD., Tokyo (JP)

(72) Inventors: Tetsuya Wakiyama, Kanagawa (JP); Kiyotaka Tsuchibuchi, Kanagawa (JP); Junichi Shimizu, Kanagawa (JP); Hiroshi Niina, Kanagawa (JP); Masashi Okano, Kanagawa (JP); Hiroshi Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/805,830

(22) Filed: Nov. 7, 2017

(65) Prior Publication Data

US 2018/0278798 A1    Sep. 27, 2018

(30) Foreign Application Priority Data

Mar. 24, 2017    (JP) .................. 2017-059412

(51) Int. Cl.
*H04N 1/00*       (2006.01)
*H04N 1/387*      (2006.01)
(Continued)

(52) U.S. Cl.
CPC ......... *H04N 1/3877* (2013.01); *H04N 1/0473* (2013.01); *H04N 1/3935* (2013.01);
(Continued)

(58) Field of Classification Search
CPC .................................................. H04N 1/3877
See application file for complete search history.

(56) References Cited

U.S. PATENT DOCUMENTS 7,307,762 B2    12/2007    Yaguchi
7,532,348 B2    5/2009    Yaguchi
(Continued)

FOREIGN PATENT DOCUMENTS

JP    2004-266513 A    9/2004
JP    2010-258903 A    11/2010
(Continued)

*Primary Examiner* — Benjamin O Dulaney
(74) *Attorney, Agent, or Firm* — Oliff PLC (57) ABSTRACT

An image processing apparatus includes an image acquisition section that acquires pieces of image data acquired by performing image reading in a sub scan direction in a unit of a line extending in a main scan direction, an orientation changing section that changes an orientation of each of data images represented by the respective pieces of image data acquired by the image acquisition section, and an image processing section that performs image processing serially on the pieces of image data acquired by the image acquisition section. The image processing section performs the image processing every predetermined number of pieces of image data serving as a predetermined processing unit. The image processing section changes the predetermined processing unit for the image processing to a processing unit different from the predetermined processing unit in a case where the orientation is changed by the orientation changing section.

11 Claims, 7 Drawing Sheets

(51) Int. Cl.
*H04N 1/047* (2006.01)
*H04N 1/393* (2006.01)
*H04N 1/46* (2006.01)

(52) U.S. Cl.
CPC ............... *H04N 1/46* (2013.01); *H04N 1/393* (2013.01); *H04N 2201/0094* (2013.01)

(56) References Cited

U.S. PATENT DOCUMENTS

| | | | |
|---|---|---|---|
| 8,508,775 B2* | 8/2013 | Saisho | H04N 1/41 358/1.15 |
| 2010/0245916 A1* | 9/2010 | Fukaya | G06T 3/602 358/1.16 |
| 2012/0180023 A1* | 7/2012 | Seki | G06F 8/30 717/108 |
| 2013/0257882 A1* | 10/2013 | Ooguni | G06T 1/20 345/505 |
| 2016/0028960 A1* | 1/2016 | Ko | H04N 5/772 348/333.12 |
| 2016/0162236 A1* | 6/2016 | Mori | G06F 3/1256 358/1.15 |
| 2017/0171428 A1* | 6/2017 | Kawano | H04N 1/00718 |

FOREIGN PATENT DOCUMENTS

| | | | |
|---|---|---|---|
| JP | 5186432 B2 | 4/2013 | |
| JP | 5538792 B2 | 7/2014 | |

\* cited by examiner

IMAGE PROCESSING APPARATUS AND NON-TRANSITORY COMPUTER READABLE MEDIUM INCLUDING CHANGE OF AN IMAGE PROCESSING UNIT AFTER PERFORMANCE OF A ROTATION

CROSS-REFERENCE TO RELATED APPLICATIONS

This application is based on and claims priority under 35 USC 119 from Japanese Patent Application No. 2017-059412 filed Mar. 24, 2017.

BACKGROUND

Technical Field

The present invention relates to image processing apparatuses and a non-transitory computer readable medium.

When image processing is performed on image data, rotation or the like is performed on a data image in some cases, and thereby the orientation of the data image is changed. In the image processing as described above, regardless of whether the orientation of the data image is changed, if the image processing is to be started after input images are scanned in predetermined processing units in a main scan direction, it takes time to accumulate pieces of image data, and thus this delays the start of the image processing in some cases.

SUMMARY

According to an aspect of the invention, there is provided an image processing apparatus including an image acquisition section, an orientation changing section, and an image processing section. The image acquisition section acquires pieces of image data acquired by performing image reading in a sub scan direction in a unit of a line extending in a main scan direction. The orientation changing section changes an orientation of each of data images represented by the respective pieces of image data acquired by the image acquisition section. The image processing section performs image processing serially on the pieces of image data acquired by the image acquisition section. The image processing section performs the image processing every predetermined number of pieces of image data serving as a predetermined processing unit. The image processing section changes the predetermined processing unit for the image processing to a processing unit different from the predetermined processing unit in a case where the orientation is changed by the orientation changing section.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described in detail with reference to the attached drawings.

Hardware Configuration of Image Processing Apparatus

Figure 1:
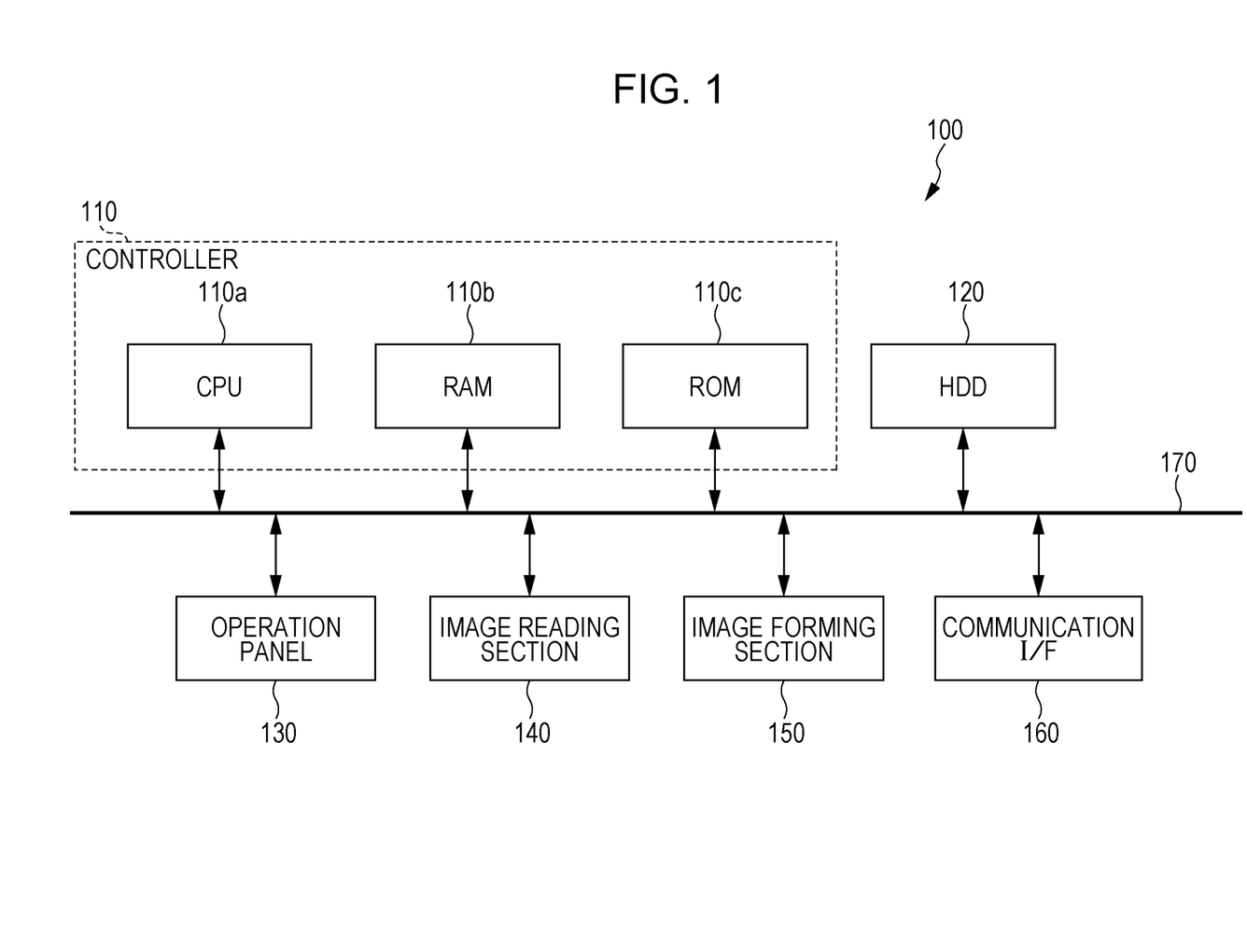
FIG. 1 is a diagram illustrating an example hardware configuration of an image processing apparatus according to the exemplary embodiment.

First, the hardware configuration of an image processing apparatus 100 according to the exemplary embodiment will be described. FIG. 1 is a diagram illustrating an example hardware configuration of the image processing apparatus 100 according to the exemplary embodiment. The image processing apparatus 100 according to the exemplary embodiment is, for example, a multifunctional printer having various image processing functions such as an image reading function (scanning function), a printing function, a copying function, and a facsimile function.

As illustrated in FIG. 1, the image processing apparatus 100 according to the exemplary embodiment includes a controller 110, a hard disk drive (HDD) 120, an operation panel 130, an image reading section 140, an image forming section 150, and a communication interface (I/F) 160. Note that these functional sections are connected to a bus 170 and exchange data via the bus 170.

The controller 110 controls operations of the sections of the image processing apparatus 100. The controller 110 includes a central processing unit (CPU) 110a, a random access memory (RAM) 110b, and a read only memory (ROM) 110c.

The CPU 110a implements the functions of the image processing apparatus 100 in such a manner as to load various programs stored in the ROM 110c in the RAM 110b and thereby run the programs. The RAM 110b is a memory used as a work memory for the CPU 110a. The ROM 110c is a memory used for storing the various programs to be run by the CPU 110a.

Note that the RAM 110b is used as an example of a holding section in the exemplary embodiment.

The HDD 120 is a memory storing various pieces of data. The HDD 120 stores therein image data and the like received from an external apparatus via the communication I/F 160.

The operation panel 130 displays various pieces of information and receives user operations from a user for performing apparatus operations using the various functions. Examples of the operation panel 130 include a touch panel display.

The image reading section 140 reads an image formed on a recording material (document) such as paper and generates image data (image information) representing the read image.

The image reading section 140 is, for example, a scanner. A charge coupled device (CCD) scanner and a contact image sensor (CIS) scanner may be used. In the CCD scanner, light is radiated from a light source, reflected on the document, reduced by a lens, and received by a CCD. In the CIS scanner, light beams are serially radiated from a light emitting diode (LED) light source, reflected on the document, and received by a CIS.

More specifically, the image reading section 140 reads the document, for example, in units of an object extending in the main scan direction orthogonal to a direction (sub scan direction) in which an imaging device is moved and generates image data. In other words, the image reading section 140 generates the image data in such a manner as to read the document in the sub scan direction in units of a line extending in the main scan direction.

The image forming section 150 is a printing mechanism that forms an image on a recording material such as paper. The image forming section 150 is, for example, a printer. An electrophotographic printer and an inkjet printer may be used. The electrophotographic printer forms an image in such a manner that toner caused to attach to a photoconductor is transferred onto a recording material. The inkjet printer forms an image in such a manner that ink is discharged onto a recording material.

The communication I/F 160 is a communication interface that transmits and receives various pieces of data to and from other apparatuses through a network (not illustrated).

In the image processing apparatus 100, under the control of the controller 110, the image reading section 140 implements the scanning function, the image forming section 150 implements the printing function, the image reading section 140 and the image forming section 150 implement the copying function, and the image reading section 140, the image forming section 150, and the communication I/F 160 implement the facsimile function.

Functional Configuration of Image Processing Apparatus

Figure 2:
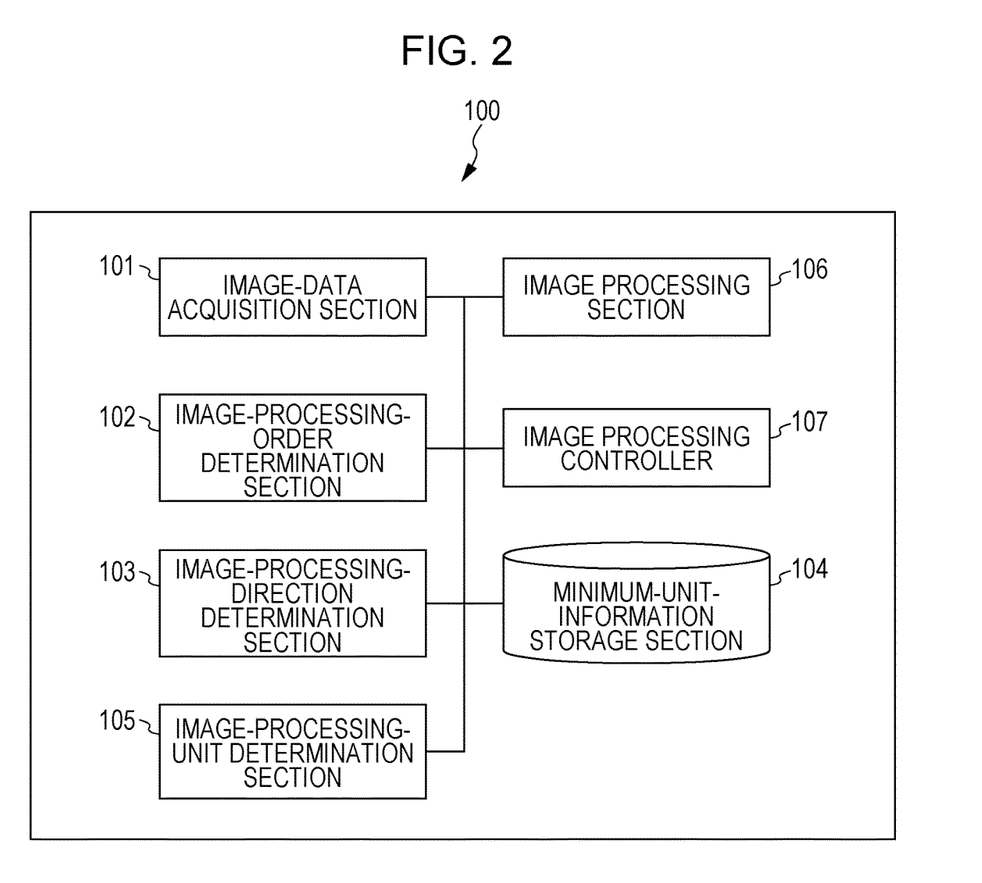
FIG. 2 is a block diagram illustrating an example functional configuration of the image processing apparatus according to the exemplary embodiment.

The functional configuration of the image processing apparatus 100 according to the exemplary embodiment will be described. FIG. 2 is a block diagram illustrating an example functional configuration of the image processing apparatus 100 according to the exemplary embodiment. The image processing apparatus 100 according to the exemplary embodiment includes an image-data acquisition section 101, an image-processing-order determination section 102, an image-processing-direction determination section 103, a minimum-unit-information storage section 104, an image-processing-unit determination section 105, an image processing section 106, and an image processing controller 107.

The image-data acquisition section 101 acquires image data generated in such a manner that the image reading section 140 reads an image on the document.

The image processing section 106 executes various image processing processes on the image data. In each image processing process, pieces of image data having undergone the image processing process are serially written to (accumulated in) the memory (RAM 110*b*). The image processing processes executed by the image processing section 106 are classified into five processes that are a first process, a rotation process, an enlargement process, a second process, and a third process. After the image processing section 106 completes all of the image processing processes, for example, the image forming section 150 performs printing.

The first process is executed before the rotation process and the enlargement process, and a character edge detection process, a filtering process, a color conversion process, and the like are executed on the image data. In the color conversion process in the first process, for example, image data in a red, green, and blue (RGB) color space (24 bits) is converted to image data in a Lab color space (24 bits). The character edge detection process and the filtering process are executed by referring to multiple lines, and thus an increase in the number of pixels per line leads to an increase by the number of pixels in a line memory space.

The second process is executed after the rotation process and the enlargement process, and a gamma correction, a halftone process, a color conversion process, a tone correction process, and the like are executed on the image data. In the color conversion process in the second process, for example, image data in the Lab color space (24 bits) is converted to image data in a cyan, magenta, yellow, black (CMYK) color space (32 bits).

In the third process, an error diffusion (ED) process and the like are executed. In the ED process, an error needs to be propagated to neighboring pixels, and thus pieces of data corresponding to a page width in the main scan direction needs to be processed in succession.

In the enlargement process, a data image is enlarged in accordance with the orientation of the image. In the rotation process, the data image is rotated (the orientation of the data image is changed) in accordance with the orientation of the image, for example, every 90 degrees, or by a slight angle to correct the skew of the image. In further explanation, in the rotation process, a direction in which image data not having undergone the rotation is read from the memory and a direction in which the image data having undergone the rotation is written to the memory are made different from each other, and portrait/landscape change is thereby performed on the image.

For example, suppose a case where an A4 landscape image is printed on an A3 portrait sheet. The image reading section 140 inputs the image line by line for the first process, and the first process is executed line by line or band by band. Executing the rotation process and the enlargement process after the first process enables prevention of an increase in the line memory space for the character edge detection process and the filtering process included in the first process. In addition, since the rotation process and the enlargement process need to be complete before the ED process in the third process, the rotation process and the enlargement process are executed in the Lab color space (24 bits) not having undergone conversion to the CMYK color space (32 bits), that is, before the second process, with an intermediate data size is taken into consideration.

The image-processing-order determination section 102 determines the order in which the image processing processes are executed in pixel units on the image data. The order in which the image processing processes are executed is determined on the basis of the content (algorithm) of the image processing processes to be executed. For example, in a case where multiple image processing processes are executed, it is determined whether each image processing process is to be executed before or after an adjacent one of the image processing processes.

More specifically, the order of image processing processes is determined on the basis of information such as a printing mode, color settings, and a sheet feed orientation that are print settings. The above-described print settings are performed in such a manner that the user operates, for example, the operation panel 130 at the time of printing.

Note that the printing mode is a mode for printing performed by the image forming section 150, and examples of the printing mode include a photo mode for a photo document and a text mode for a text document. The color settings are settings of colors in printing, and examples of the color settings include a full color setting, a gray setting, and a black-and-white setting. The sheet feed orientation is the orientation of a sheet fed to the image forming section 150, and examples of the sheet feed orientation include a long edge feed (LEF) and a short edge feed (SEF).

The image-processing-direction determination section 103 determines, on a per image-processing-process basis, a start location in the memory for starting an image processing process. The image-processing-direction determination section 103 also determines, on a per image-processing-process basis, a direction in which image data is input in processing units (that is, a direction in which the image data is read out from the memory in the processing units) and a direction in which the image data is output in the processing units (that is, a direction in which the image data is written to the memory in the processing units).

Note that the image-processing-direction determination section 103 determines, on a per image-processing-process basis, a start location in the memory for starting an image processing process. The image-processing-direction determination section 103 determines the start location on the basis of, for example, a start location for an image processing process preceding the image processing process, in other words, on the basis of the location in the memory for starting writing of the image data in the previous image processing process. The image-processing-direction determination section 103 also determines, on a per image-processing-process basis, the direction in which reading is performed in the processing units in the image processing process. The image-processing-direction determination section 103 determines the reading direction on the basis of, for example, the direction in which writing is performed in the processing units in the previous image processing process, in other words, on the basis of the direction in which the image data is written to the memory in the processing units in the previous image processing process.

In further explanation, in a case where the rotation process is executed on the image data, the image-processing-direction determination section 103 changes the start location for an image processing process to be executed after the rotation process. The image-processing-direction determination section 103 changes the start location in accordance with the start location for the rotation process. In other words, the image processing processes are serially executed by the image processing section 106 from a predetermined start location, and in a case where the rotation process is executed, the start location for the subsequent image processing process is changed to a different location from the predetermined start location. In additional explanation, pieces of image data are serially read out in each image processing process executed by the image processing section 106 from its predetermined start location in the memory, and in the case where the rotation process is executed, a piece of image data is read from the location different from the predetermined start location in the subsequent image processing process.

Suppose a case where the image-processing-direction determination section 103 determines a processing direction for an image processing process. If the minimum processing unit is a band in this case, the image-processing-direction determination section 103 determines that the image processing process is to be executed band by band in the sub scan direction as the processing direction, with a data transfer efficiency being taken into consideration. If the minimum processing unit is a tile, and if the image processing process is not the rotation process, the image-processing-direction determination section 103 determines, as directions of reading and writing performed tile by tile, the same direction as a direction of writing performed in processing units in the previous image processing process. In contrast, if the image processing process is the rotation process, the image-processing-direction determination section 103 determines, as a direction of reading performed tile by tile, the same direction as the direction of writing performed in the processing units in the previous image processing process and determines, as a direction of writing performed tile by tile, a direction of rotation to a designated orientation.

In further explanation, in the case where the rotation process is executed on the image data, the image-processing-direction determination section 103 changes the processing direction for the subsequent image processing process in accordance with the processing direction for the rotation process. In other words, the image processing process is executed by the image processing section 106 in a predetermined direction, and in the case where the rotation process is executed, the processing direction in the subsequent image processing process is changed to a direction different from the predetermined direction.

The minimum-unit-information storage section 104 stores therein pieces of information respectively indicating minimum units of image data (hereinafter, referred to as minimum-unit information), the minimum units each being usable to execute the corresponding image processing process. Each usable minimum unit of the image data is predetermined on the basis of the algorithm for the corresponding image processing process. Examples of the minimum units include a line, a tile, and a band. The line unit is based on a line extending in one of the directions (main scan direction) in a data image. The tile unit is based on a square having several pixels in the main scan direction and several lines in the sub scan direction. The band unit is based on one or more lines (such as one line or two lines). In the exemplary embodiment, the line unit is conceptually included in the band unit and thus handled as the band unit.

The image-processing-unit determination section 105 determines, on a per image-processing-process basis, the processing unit of image data used for executing an image processing process. The image-processing-unit determination section 105 determines, on a per image-processing-process basis, the processing unit for the image processing process on the basis of, for example, the minimum-unit information acquired from the minimum-unit-information storage section 104, the processing unit for the previous image processing process, and the direction in which writing is performed in the processing units in the previous image processing process.

The image-processing-unit determination section 105 determines a band as the processing unit for an image processing process to be executed before the rotation process. The image-processing-unit determination section 105 determines the processing unit for the rotation process on the basis of a rotation angle. For example, if the rotation angle is 90 degrees or 270 degrees, the image-processing-unit determination section 105 determines a tile as the processing unit for the rotation process. In contrast, for example, if the rotation angle is 180 degrees, the image-processing-unit determination section 105 determines a tile or a band as the processing unit for the rotation process. Further, for an image processing process after the rotation process, in a case where each of the minimum unit for the image processing process and the processing unit for the previous image processing process is a tile and where the direction in which writing is performed in the processing units for the previous image processing process is the sub scan direction, the image-processing-unit determination section 105 determines a tile as the processing unit. In other cases, the image-processing-unit determination section 105 determines a band as the processing unit.

In further explanation, in the case where the rotation process is executed on the image data, the image-processing-unit determination section 105 changes the processing unit for the subsequent image processing process in accordance with the processing unit for the rotation process. In other words, the image processing processes are serially executed by the image processing section 106 on the pieces of image data in predetermined processing units, and in the case where the rotation process is executed, the processing unit for the subsequent image processing process is changed to a unit different from the predetermined processing unit.

For example, if the minimum-unit information regarding an image processing process indicates one pixel, the image-processing-unit determination section 105 determines a tile composed of M pixels×N lines as the processing unit for the image processing process. Values used for M and N are set in advance on the basis of, for example, the capacity of a memory storing intermediate data for image processing processes and the burst length at the time of data transfer from the memory. In addition, in a case where reference to neighboring pixels is needed to obtain a processing result for one pixel in a process such as a filtering process based on seven pixels×seven lines, a tile composed of (M+6) pixels×(N+6) lines may be used as the processing unit with six pixels and six lines corresponding to the neighboring pixels taken into consideration.

The image processing controller 107 controls the image processing processes executed by the image processing section 106. The image processing controller 107 causes the various image processing processes to be executed, determining the execution of an image processing process to be executed next on the basis of the progress of the image processing processes and in accordance with the order determined by the image-processing-order determination section 102. More specifically, for example, in a case where two image processing processes are to be executed in succession, the second image processing process waits until the first image processing process causes image data to be accumulated in the memory. After the image data corresponding to a processing unit for the second image processing process is accumulated in the memory, the second image processing process is started in the processing direction determined by the image-processing-direction determination section 103.

The functional sections included in the image processing apparatus 100 illustrated in FIG. 2 are implemented in such a manner that software and hardware resources cooperate with each other. Specifically, in a case where the image processing apparatus 100 is implemented in the hardware configuration illustrated in FIG. 1, the operating system (OS) program and application programs stored in, for example, the ROM 110*c* are loaded in the RAM 110*b* and run by the CPU 110*a*, and functions of the image-data acquisition section 101, the image-processing-order determination section 102, the image-processing-direction determination section 103, the image-processing-unit determination section 105, the image processing section 106, the image processing controller 107, and the like are implemented. The minimum-unit-information storage section 104 is implemented by the memory such as the RAM 110*b* or the HDD 120.

In the exemplary embodiment, the image-data acquisition section 101 is used as an example of an image acquisition section, and the image processing section 106 is used as an example of a direction changing section and an image processing section.

Flow of Processes Executed by Image Processing Apparatus

Figures 3A, 3B:
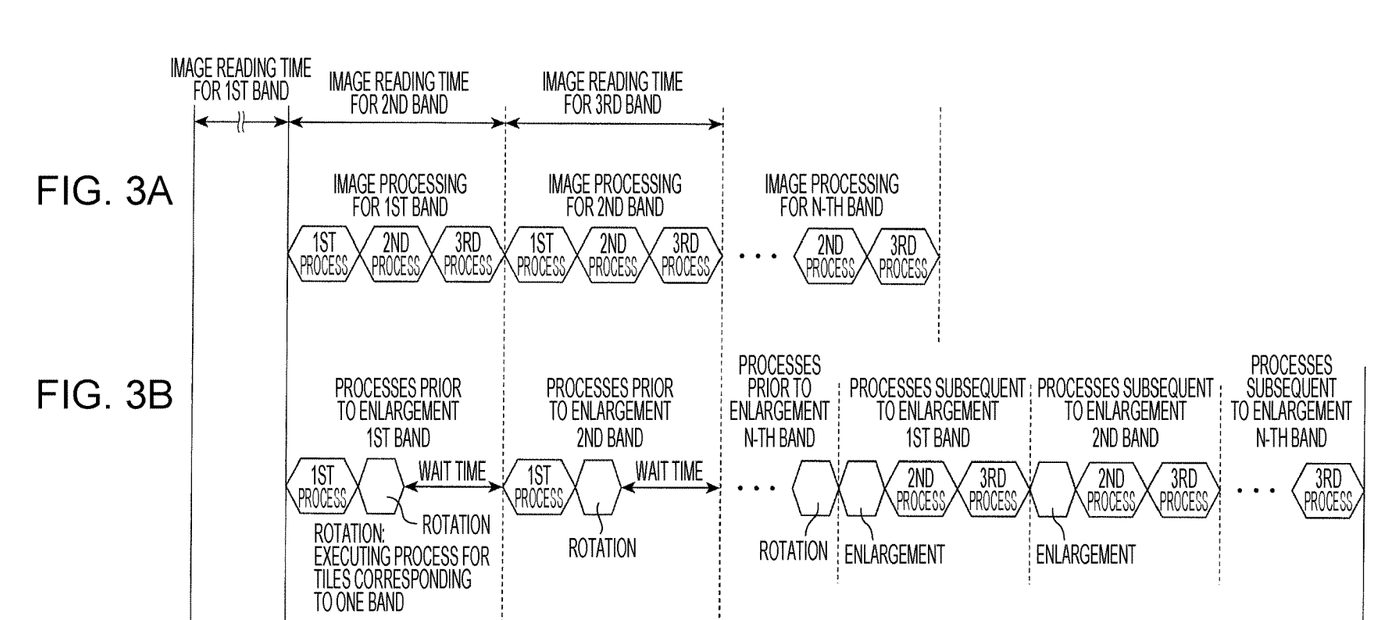
FIGS. 3A and 3B are diagrams for explaining example process flow in the related art.
Figure 3C:
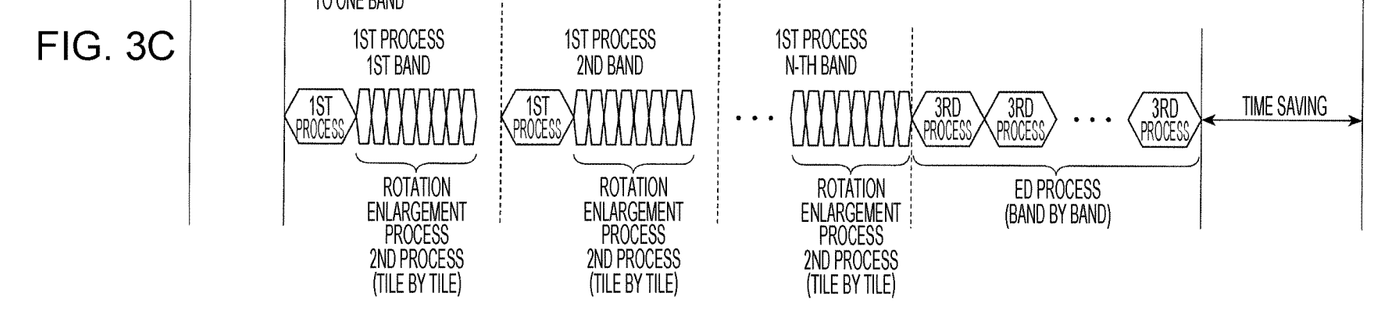
FIG. 3C is a diagram for explaining example flow of processes executed by the image processing apparatus according to the exemplary embodiment.

The flow of the processes executed by the image processing apparatus 100 will be described compared with processes in the related art. FIGS. 3A and 3B are diagrams for explaining example process flow in the related art. FIG. 3C is a diagram for explaining example flow of the processes executed by the image processing apparatus 100 according to the exemplary embodiment. The examples illustrated in FIGS. 3A to 3C are described on the assumption that image data corresponding to one page of a document is processed.

First, the process flow in the related art will be described with reference to FIGS. 3A and 3B. In the examples illustrated in FIGS. 3A and 3B, various image processing processes are executed as hardware processing using an application specific integrated circuit (ASIC) in the related art. The ASIC is an integrated circuit manufactured specially for a specific use. The individual image processing processes are executed in conjunction with each other via a memory. After an amount of image data needed for one of image processing processes is accumulated in the memory, the image data is transferred to an image processing section. After the image processing process is executed, a processing result is transferred to the memory.

In the example illustrated in FIG. 3A, the rotation process and the enlargement process are not executed on the image data, and the image data is processed in an actual size in the first process, the second process, and the third process. In this case, an image is read by the image reading section 140 line by line, and the first process, the second process, and the third process are serially executed on generated image data. More specifically, image reading in the first line is first performed, and image data in the first line is stored in the memory. Thereafter, after image data corresponding to one band is stored in the memory, the first process, the second process, and the third process are executed on the image data in the first band. In addition, while the first process, the second process, and the third process are being executed on the image data in the first band, image reading is performed in the second band that is the next band. Accordingly, after the first process, the second process, and the third process are complete for the image data in the first band, the first process, the second process, and the third process are executed on the image data in the second band stored in the memory. The first process, the second process, and the third process are thus executed band by band without a wait time.

In the example illustrated in FIG. 3B, a 270-degree-rotation process and the enlargement process in addition to the first process, the second process, and the third process are executed on the image data. Note that the rotation process is executed tile by tile, and the orientation of the data image is changed after the rotation process because as described above, the portrait/landscape change is performed on the image. In the portrait/landscape change, the reading direction in which image data not having undergone the rotation is read from the memory tile by tile and the writing direction in which the image data having undergone the rotation is written to the memory tile by tile are made different from each other. Consequently, if image processing processes are to be executed band by band after the rotation process, and if the start location in the memory for starting reading the image data or a direction of reading the image data from the memory is fixed, a wait time occurs in some cases. The wait time lasts until the pieces of image data having undergone the rotation are accumulated in locations for the reading in the memory.

More specifically, in the example illustrated in FIG. 3B, image reading is first performed in the first line, and the image data in the first line is stored in the memory. Thereafter, after the image data corresponding to one band is stored in the memory, the first process is executed on the image data in the first band. Note that in the example in FIG. 3B, the height of lines constituting a band to be output in the first process is equal to the height of a tile in the rotation process. After the first process is complete for the image data corresponding to one band, the rotation process is executed tile ty tile, and storing rotation results tile by tile is started in the location in the memory in accordance with the rotation direction. The image data corresponding to one band undergoes the rotation process. Note that the enlargement process, the second process, and the third process are not executed, and thus a wait time occurs. Meanwhile, image reading is performed in the second band. After the image data in the second band is stored in the memory, the first process and the rotation process are executed. However, the enlargement process, the second process, and the third process are not executed, and the wait time occurs again.

As described above, the first process and the rotation process are serially executed; however, the enlargement process, the second process, and the third process are not executed, and the wait time occurs. After all of results of the rotation process corresponding to one page of the document are accumulated in the memory, the image data in the memory becomes readable for the enlargement process, the second process, and the third process, and these processes are executed band by band. As described above, in the example illustrated in FIG. 3B, the wait time occurs in each band before the enlargement process.

The example flow of the processes executed by the image processing apparatus 100 according to the exemplary embodiment will be described with reference to FIG. 3C. In FIG. 3C, the 270-degree-rotation process and the enlargement process in addition to the first process, the second process, and the third process as in the example illustrated in FIG. 3B are executed. Since it is possible to execute the enlargement process and the second process by dividing an image into tiles, a tile is specified as the minimum unit. In contrast, since the ED process in the third process needs to be executed line by line as described above, a band is specified as the minimum unit. In the exemplary embodiment, various image processing processes are executed as software processing (processing performed by the CPU 110a) as described above.

The image-processing-order determination section 102 determines the order in which image processing processes are to be executed on the image data. The image-processing-unit determination section 105 determines the processing unit for an image processing process on a per image-processing-process basis. Further, the image-processing-direction determination section 103 determines, on a per image-processing-process basis, the start location for the image processing process, the reading direction for a processing unit, and the direction in which writing is performed in processing units. The image processing section 106 serially performs the image processing processes on the basis of the determinations performed by the respective sections.

Consequently, as illustrated in FIG. 3C, the first process is executed band by band. In the rotation process, a result of the 270-degree-rotation process is written to the memory in the sub scan direction tile by tile. Note that the minimum unit for the enlargement process is a tile, and the processing unit for the rotation process preceding the enlargement process is also a tile. In addition, the direction in which writing is performed in the processing units in the rotation process is the sub scan direction. Accordingly, the image-processing-unit determination section 105 determines a tile as the processing unit for the enlargement process. In addition, since the enlargement process is an image processing process not involving rotation, the image-processing-direction determination section 103 still uses the same scan direction as that in the rotation process and thus determines, as the directions of reading and writing performed in the processing units (tile by tile in this case), the sub scan direction that is the same as the writing direction in the rotation process.

Likewise, also for the second process, a tile is determined as the processing unit, and the sub scan direction is determined as the directions of reading and writing performed in the processing units. Further, the minimum unit for the ED process in the third process is a band. The image-processing-unit determination section 105 thus determines a band as the processing unit for the ED process. The image-processing-direction determination section 103 determines that scanning is to be performed serially in the sub scan direction on each band that is the processing unit.

In further explanation, in the example illustrated in FIG. 3C, image reading is first performed in the first line, and then image data in the first line is stored in the memory. Subsequently, after the image data corresponding to one band is stored in the memory, the first process is executed on the image data in the first band. Note that in the example illustrated in FIG. 3C, the height of lines constituting a band to be output in the first process is equal to the height of a tile in the rotation process. After the first process is complete for the image data corresponding to one band, the rotation process, the enlargement process, and the second process are executed on image data corresponding to one tile having a smaller amount than that of one band. Note that the start location for an image processing process, the processing direction, and the processing unit are changed in accordance with those for the rotation process, the enlargement process and the second process are thereby executed without waiting for accumulation of image data corresponding to one page of the document in the memory. The third process is in a wait state because the third process is executed band by band in the sub scan direction; however, image reading is performed in the second band while the enlargement process and the second process are being executed, and subsequently the first process, the rotation process, the enlargement process, and the second process are executed on the image data in the second band.

In this manner, the exemplary embodiment enables the first process, the rotation process, the enlargement process, and the second process to be executed serially and thus a wait time to be reduced. After all of results of the rotation process for one page of the document are accumulated in the memory, the image data in the memory becomes readable for the third process, and the third process is executed band by band. In this manner, the first process, the rotation process, the enlargement process, the second process, and the third process are executed serially.

In the exemplary embodiment as described above, the start location for an image processing process, the processing direction, and the processing unit are changed in accordance with those for the rotation process, and the image processing processes are executed serially. As the result, a time taken until the image processing processes are complete is reduced in the exemplary embodiment compared with the case illustrated in FIG. 3B.

Figure 4:
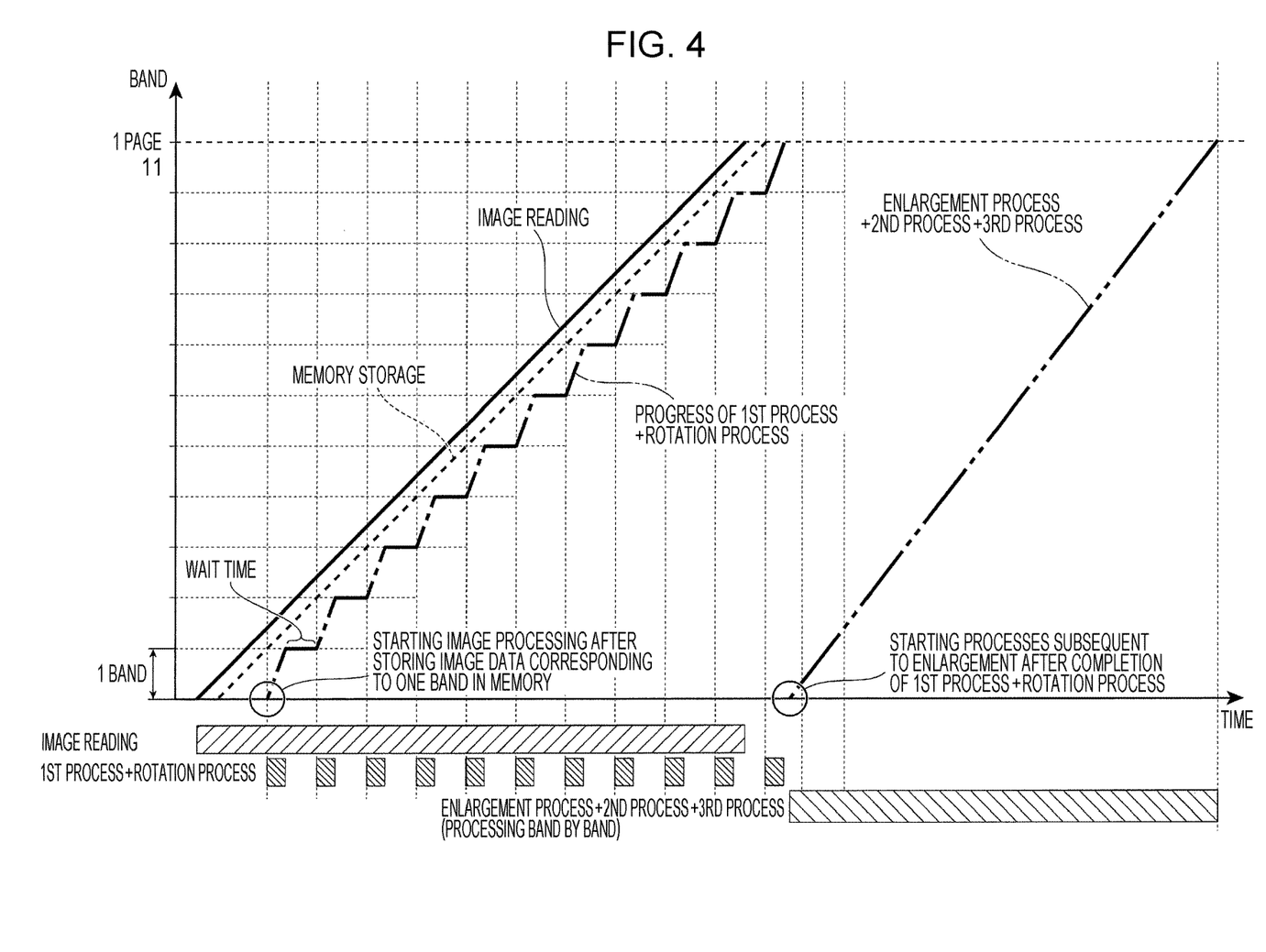
FIG. 4 is a diagram for explaining the processes in the related art illustrated FIG. 3B.
Figure 5:
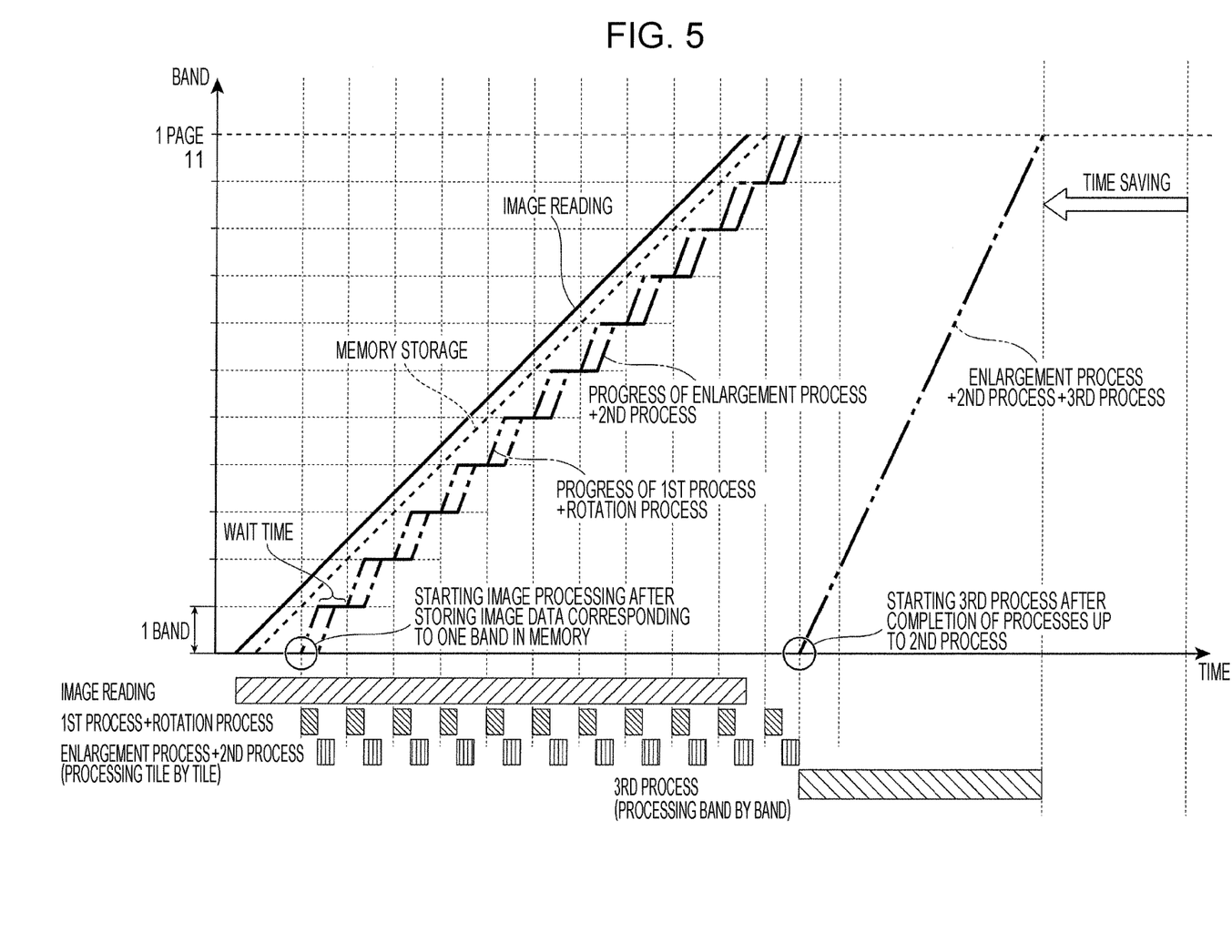
FIG. 5 is a diagram for explaining the processes executed by the image processing apparatus according to the exemplary embodiment.

FIG. 4 is a diagram for explaining the processes in the related art illustrated in FIG. 3B. FIG. 5 is a diagram for explaining the processes performed by the image processing apparatus 100 according to the exemplary embodiment. The examples illustrated in FIGS. 4 and 5 will be described on the assumption that one page of a document corresponds to 11 bands.

In the processes in the related art as illustrated in FIG. 4, an image is read line by line. After the image data corresponding to one band is stored in the memory, the image processing processes are started in order. The first process is executed band by band serially. After the image data corresponding to one band is input, the rotation process is executed tile by tile. After the rotation process corresponding to one band that is an output unit in the first process is complete, processes subsequent to the enlargement process are not executed, but the first process is executed for the next band. However, a wait time occurs, the wait time lasting until the image data in the next band is acquired from the image reading section 140 and stored in the memory. The first process and the rotation process are executed for each band in this manner. After the first process and the rotation process are complete for the image data corresponding to one page (11 bands in this case), the enlargement process, the second process, and the third process are executed serially band by band.

In contrast, in the exemplary embodiment as illustrated in FIG. 5, image reading is performed line by line. After the image data corresponding to one band is stored in the memory, the image processing processes are started in order. The first process is executed band by band serially. After the image data corresponding to one band is input, the rotation process is executed tile by tile. Further, in the exemplary embodiment, the enlargement process and the second process are executed serially tile by tile. After the first process, the rotation process, the enlargement process, and the second process are complete for the image data corresponding to one page (11 bands in this case), operations in the third process are performed in succession at the end.

Specific Example of Image Processing Performed by Image Processing Apparatus

Figure 6A:
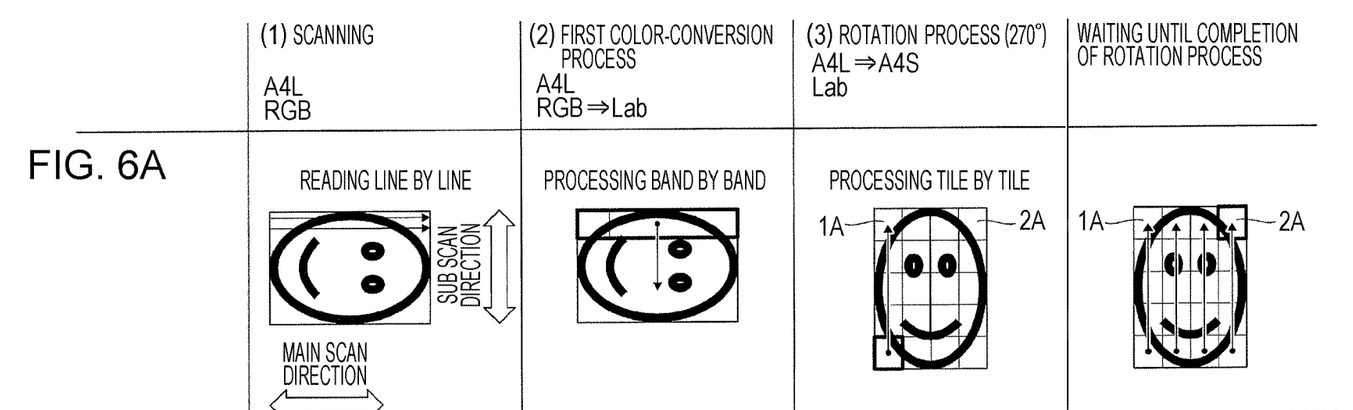
FIG. 6A is a diagram illustrating a specific example of the processes in the related art illustrated in FIG. 3B.
Figure 6B:
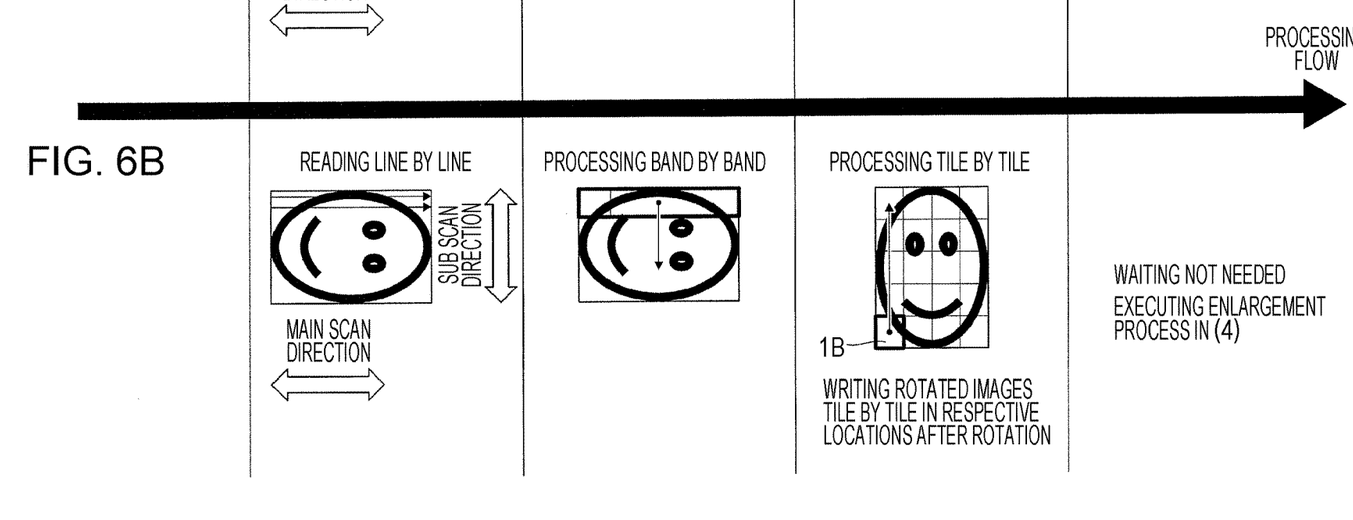
FIG. 6B is a diagram illustrating a specific example of the processes executed by the image processing apparatus according to the exemplary embodiment.
Figure 7A:
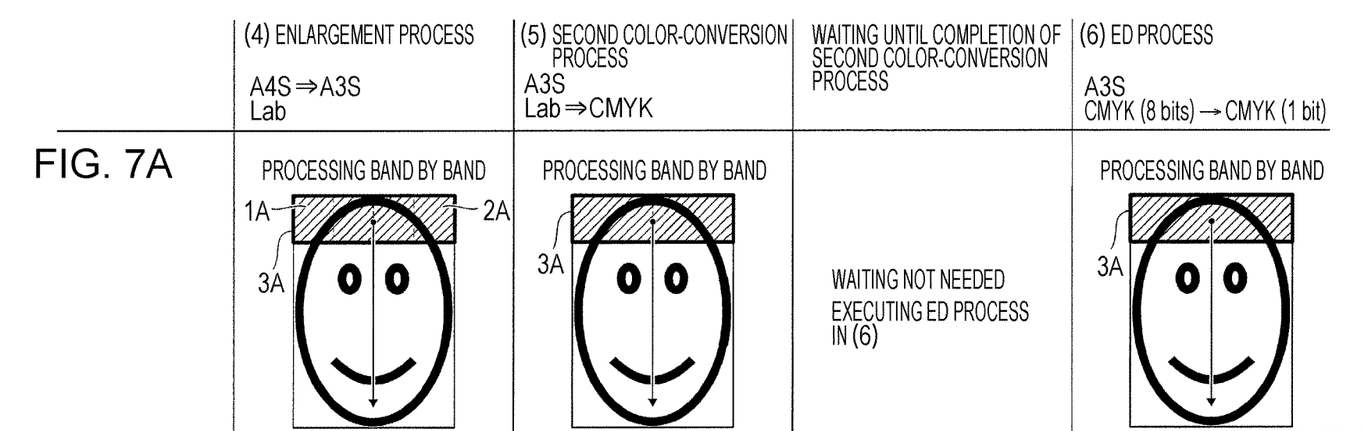
FIG. 7A is a diagram illustrating the specific example of the processes in the related art illustrated in FIG. 3B.
Figure 7B:
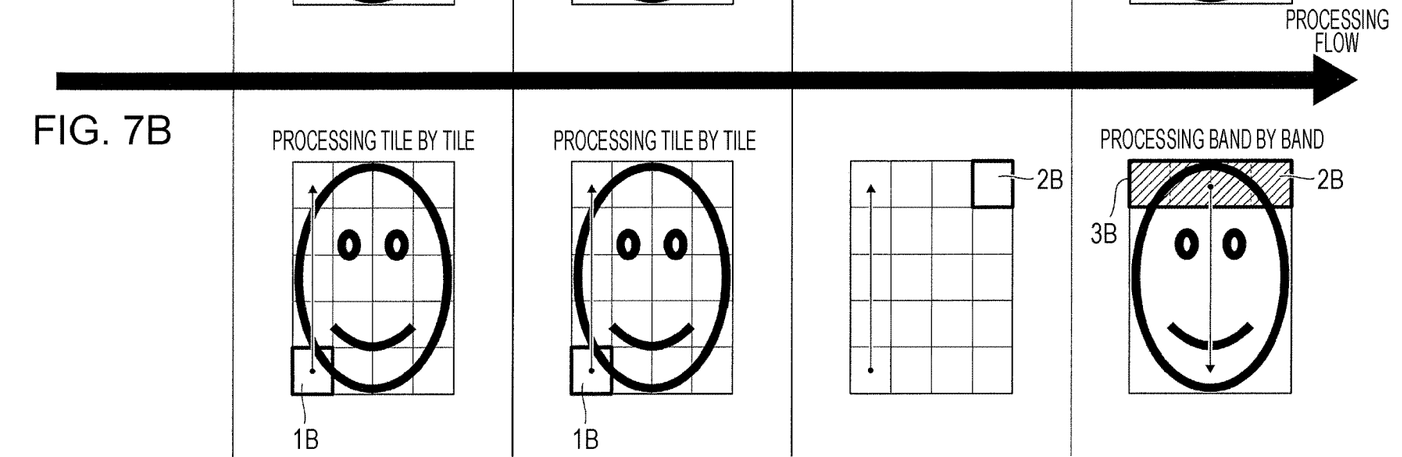
FIG. 7B is a diagram illustrating the specific example of the processes executed by the image processing apparatus according to the exemplary embodiment.

Image processing processes executed by the image processing apparatus 100 according to the exemplary embodiment will be described by taking a specific example. In the description, the image processing processes are compared with the processes in the related art. FIGS. 6A and 7A are diagrams illustrating a specific example of the processes in the related art illustrated in FIG. 3B, and FIGS. 6B and 7B are diagrams illustrating the specific example of the processes executed by the image processing apparatus 100 according to the exemplary embodiment.

The examples illustrated in FIGS. 6A to 7B are described on the assumption that image data corresponding to one page of a document is processed. The first process, the rotation process, the enlargement process, the second process, and the third process are executed on the image data. In the examples illustrated in FIGS. 6A to 7B, a first color-conversion process, a second color-conversion process, and the ED process are executed as the first process, the second process, and the third process, respectively.

The process flow in the related art will be described with reference to FIGS. 6A and 7A. First, as illustrated in FIG. 6A, scanning (image reading) is performed in the main scan direction (rightwards in FIG. 6A) line by line. After image data corresponding to one band is stored in the memory, the first color-conversion process is executed in a direction along the width of a data image (in the main scan direction, that is, rightwards in FIG. 6A) on the image data corresponding to one band. Subsequently, the rotation process for rotating the data image clockwise by 270 degrees is executed tile by tile.

As illustrated in FIG. 7A, the enlargement process is then executed band by band. Among the processes in the related art, a location 1A in the memory is predetermined as the start location for the enlargement process. A downward direction in FIG. 7A (sub scan direction) is predetermined as a direction of processing the image data for each band extending laterally in FIG. 7A (in the main scan direction). Accordingly, in the enlargement process, reading is performed in an area 3A in the memory that is hatched in FIG. 7A. In contrast, as illustrated in FIG. 6A, the rotation process that is the previous process is executed upwards in FIG. 6A (in the sub scan direction). As the result, the enlargement process is not started until the image data is accumulated in a location 2A in the memory, that is, until the rotation process causes the image data corresponding to one page of the document to be accumulated in the memory.

Accordingly, in the processes in the related art as described, for example, in FIG. 3B, waiting is performed before the enlargement process, the second process (second color-conversion process), and the third process (ED process), the waiting lasting until the rotation process is complete and the image data corresponding to one page of the document is accumulated in the memory. After the image data corresponding to one page of the document is accumulated in the memory, the enlargement process, the second process, and the third process are started in order. In this case, the enlargement process, the second process, and the third process are serially executed on the image data in the first band. Thereafter, the enlargement process, the second process, and the third process are serially executed band by band in the sub scan direction.

The flow of the processes executed by the image processing apparatus 100 according to the exemplary embodiment will be described with reference to FIGS. 6B and 7B. First, the image reading section 140 starts scanning in the main scan direction, and the image-processing-order determination section 102 then determines the order of the image processing processes. The image-processing-order determination section 102 determines that the first color-conversion process, the rotation process, the enlargement process, the second color-conversion process, and the ED process are to be executed in this order. The image-processing-direction determination section 103 determines a start location and a processing direction on a per image-processing-process basis. Further, the image-processing-unit determination section 105 determines a processing unit for image data on a per image-processing-process basis.

The image processing controller 107 causes the image processing section 106 to execute the various image processing processes. More specifically, as illustrated in FIG. 6B, pieces of image data generated after image reading are processed serially band by band in the first color-conversion process. In the rotation process, the orientation of data images is changed in such a manner that data images having undergone the first color-conversion process preceding the rotation process are rotated by 270 degrees clockwise serially tile by tile. Thereafter, the pieces of image data are stored tile by tile in the memory upwards in FIG. 6B (in the sub scan direction).

Next, in the enlargement process, the data images having undergone the rotation process preceding the enlargement process tile by tile are serially processed in such a manner as to be scanned upwards in FIG. 7B (in the sub scan direction). Note that the minimum unit for the enlargement process and the processing unit for the previous rotation process are a tile, and the writing direction for the previous rotation process is the sub scan direction. Accordingly, the enlargement process is executed tile by tile. In accordance with the processing direction for the previous rotation process, in other words, in accordance with the direction in which the image data is accumulated in the memory in the rotation process, the upward direction in FIG. 7B (sub scan direction) is determined as the processing direction for the enlargement process. Further, in accordance with the start location for accumulating the image data in the memory in the previous rotation process, a location 1B in the memory is determined as the start location for the enlargement process.

In additional explanation, as illustrated in FIG. 7A, the enlargement process is executed band by band downwards in FIG. 7A (in the sub scan direction) in the ASIC processing in the related art, while the enlargement process is executed tile by tile upwards in FIG. 7B (in the sub scan direction) in the exemplary embodiment. In addition, the start location for the enlargement process is the location 1A in the memory in the ASIC processing in the related art, while the start location for the enlargement process is the location 1B in the memory in the exemplary embodiment.

The minimum unit for the second color-conversion process and the processing unit for the previous enlargement process are a tile, and the writing direction for the previous enlargement process is the upward direction in FIG. 7B (sub scan direction). Accordingly, the second color-conversion process is executed tile by tile. In accordance with the processing direction for the previous enlargement process, in other words, in accordance with the direction in which the image data is accumulated in the memory in the enlargement process (or the rotation process), the upward direction in FIG. 7B (sub scan direction) is determined as the processing direction. Further, in accordance with the start location for accumulating the image data in the memory in the previous enlargement process, the location 1B in the memory is determined as the start location for the second color-conversion process.

In additional explanation, as illustrated in FIG. 7A, the second color-conversion process is executed band by band downwards in FIG. 7A (in the sub scan direction) in the ASIC processing in the related art, while the second color-conversion process is executed tile by tile upwards in FIG. 7B (in the sub scan direction) in the exemplary embodiment. In addition, the start location for the second color-conversion process is the location 1A in the memory in the ASIC processing in the related art, while the start location for the second color-conversion process is the location 1B in the memory in the exemplary embodiment.

Since the minimum unit for the ED process is a band, the processing unit therefor is also a band. Operations in the ED process are performed in succession at the end. The ED process is executed band by band downwards in FIG. 7B (in the sub scan direction) in the same processing unit as in the related art because the data transfer efficiency is taken into consideration. Consequently, for example, as illustrated in FIG. 7B, the ED process is not started until the image data is accumulated in a location 2B in the memory, that is, until image data corresponding to one page of the document is stored in the memory. After waiting is performed until the second color-conversion process is complete and the image data corresponding to one page of the document is accumulated in the memory, reading is performed in an area 3B in the memory that is hatched in FIG. 7B, and the ED process is then started.

After the second color-conversion process is complete, the first color-conversion process is started for the next pixels. In this manner, the image processing processes except the ED process are serially executed in the processing units. After the first process, the rotation process, the enlargement process, and the second process are complete for the image data corresponding to one page, the ED process is executed serially band by band as illustrated in FIG. 7B.

In the exemplary embodiment as described above, the image-processing-direction determination section 103 determines, on a per image-processing-process basis, a start location in the memory for starting an image processing process and a processing direction for the image processing process. The image-processing-unit determination section 105 determines a processing unit for the image data on a per image-processing-process basis. Compared with, for example, the case where the start location for the image processing process or the processing direction is fixed and where the processing unit is fixed to a band, a wait time for an image processing process and a time until completion of the image processing processes are reduced by using the image processing apparatus 100 according to the exemplary embodiment.

In the exemplary embodiment, unit tiles of the respective image processing processes may have different sizes. For example, in the example illustrated in FIG. 7B, the size of the unit tile for the enlargement process may be different from the size of the unit tile for the second color-conversion process. For example, in a case where the unit tile for the enlargement process is composed of 64 pixels×64 pixels and where the unit tile for the second color-conversion process is composed of 256 pixels×256 pixels, the enlargement process is executed on tiles corresponding to 256 pixels×256 pixels, and thereafter the second color-conversion process is executed on a tile (256 pixels×256 pixels). For example, in a case where the unit tile for the enlargement process is composed of 256 pixels×256 pixels and where the unit tile for the second color-conversion process is composed of 64 pixels×64 pixels, the enlargement process is executed on a tile (256 pixels×256 pixels), and thereafter the second color-conversion process is executed on tiles corresponding to 256 pixels×256 pixels.

Further, in the above-described example, in a case where each of the minimum unit for the image processing process after the rotation process and the processing unit for the previous image processing process is a tile and where the direction of writing performed in processing units in the previous image processing process is the sub scan direction, the image-processing-unit determination section 105 determines a tile as the processing unit for the image processing process but may determine a band as the processing unit.

For example, in the example illustrated in FIG. 7B, the image data in the enlargement process and the second color-conversion process may be processed rightwards in FIG. 7B (in the main scan direction) for each band extending longitudinally in FIG. 7B (in the sub scan direction). Also in this case, the enlargement process and the second color-conversion process are executed without waiting until the image data corresponding to one page of the document is accumulated for executing the enlargement process and the second color-conversion process. Note that in the case where the processing unit is a band in the example illustrated in FIG. 7B, the processes are executed on the bands extending in the sub scan direction, and thus the processing unit is different from the bands extending in the main scan direction illustrated in FIG. 7A. In addition, for example, in the case where the image processing processes are executed in the upward direction in FIG. 7B (sub scan direction) used as the processing direction for each tile, the memory space for accumulating the image data may be saved compared with the case where the image data is processed in a rightward direction in FIG. 7A (in the main scan direction) used as the processing direction band by band.

In a case where the unit rotation angle for the rotation process is not 90 degrees, the image processing apparatus 100 according to the exemplary embodiment may likewise perform the image processing processes, as a matter of course. In this case, for example, the image-processing-direction determination section 103 determines, as the processing direction for an image processing process after the rotation process, a direction obtained as a result of rotation by the rotation angle with respect to the main scan direction (or the sub scan direction).

Note that in a case where the rotation process or the enlargement process is not executed on the image data, the image processing apparatus 100 according to the exemplary embodiment may likewise perform the other processes, as a matter of course.

The programs for implementing the exemplary embodiment may be provided not only by using a communication medium but also in such a manner as to be stored in a recording medium such as a compact disc-ROM.

Various exemplary embodiments and modifications have been described above, and any of these may be combined with each other.

The present disclosure is not limited to the exemplary embodiment described above and may be implemented in various modes without departing from the spirit of the disclosure.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor programmed to function as:
an image acquisition section that acquires pieces of image data acquired by performing image reading in a sub scan direction in a unit of a line extending in a main scan direction;
an orientation changing section that changes an orientation of each of data images represented by the respective pieces of image data acquired by the image acquisition section; and
an image processing section that performs a plurality of image processing processes serially on the pieces of image data acquired by the image acquisition section, the image processing section performing the image processing processes every predetermined number of pieces of image data serving as a predetermined processing unit, the image processing section:
changing the predetermined processing unit for the image processing to a processing unit different from the predetermined processing unit and performing a subsequent image processing process of the plurality of image processing processes before a previous image processing process of the plurality of image processing processes is complete when the orientation is changed by the orientation changing section, and
maintaining the predetermined processing unit for the image processing as the predetermined processing unit when the orientation is not changed by the orientation changing section, wherein
the image data includes at least one page of a document, a plurality of tiles are defined for each page of the document in the image data, and the orientation changing section changes the orientation of each of the data images using the tiles of the document as a processing unit.

2. The image processing apparatus according to claim 1, wherein the image processing section changes the predetermined processing unit for the image processing on a basis of a minimum unit of the pieces of image data and a processing unit in which the pieces of image data are processed in previous processing preceding the image processing, the minimum unit being usable for performing the image processing.

3. The image processing apparatus according to claim 1, wherein in a case where the predetermined processing unit is one or more lines, the image processing section changes the predetermined processing unit for the image processing to a unit smaller than the one or more lines.

4. The image processing apparatus according to claim 1, wherein the image processing section performs the image processing in a predetermined direction, and in the case where the orientation is changed by the orientation changing section, the image processing section changes the predetermined direction in which the pieces of image data are processed in the image processing to a direction different from the predetermined direction.

5. The image processing apparatus according to claim 4, wherein on a basis of a direction in which the pieces of image data are processed in previous processing preceding the image processing, the image processing section changes the predetermined direction in which the pieces of image data are processed in the image processing.

6. The image processing apparatus according to claim 5, wherein in accordance with a direction in which pieces of image data corresponding to a processing unit in the previous processing preceding the image processing are written to a memory, the image processing section changes the predetermined direction in which the pieces of image data are processed in the image processing.

7. The image processing apparatus according to claim 1, wherein the image processing section starts the image processing in a predetermined start location and performs the image processing serially on the pieces of image data, and in the case where the orientation is changed by the orientation changing section, the image processing section changes the predetermined start location for the image processing to a location different from the predetermined start location.

8. The image processing apparatus according to claim 7, wherein the image processing section changes the predetermined start location for the image processing on a basis of a location in a memory for starting writing of the pieces of image data in previous processing preceding the image processing.

9. The image processing apparatus according to claim 1, wherein the predetermined processing unit comprises a band unit including at least one line extending in the main scan direction, and the processing unit different from the predetermined processing unit comprises the tiles of the document.

10. An image processing apparatus comprising:
a processor programmed to function as:
an image acquisition section that acquires pieces of image data acquired by performing image reading in a sub scan direction in a unit of a line extending in a main scan direction;
an orientation changing section that changes an orientation of each of data images represented by the respective pieces of image data acquired by the image acquisition section; and
an image processing section that performs a plurality of image processing processes in a predetermined direction on the pieces of image data acquired by the image acquisition section, the image processing section:
changing the predetermined direction in which the pieces of image data are processed in the image processing processes to a direction different from the predetermined direction and performing a subsequent image processing process of the plurality of image processing processes before a previous image processing process of the plurality of image processing processes is complete when the orientation is changed by the orientation changing section, and
maintaining the predetermined direction in which the pieces of image data are processed in the image processing processes when the orientation is not changed by the orientation changing section, wherein
the image data includes at least one page of a document, a plurality of tiles are defined for each page of the document in the image data, and the orientation changing section changes the orientation of each of the data images using the tiles of the document as a processing unit.

11. A non-transitory computer readable medium storing a program causing a computer to execute a process, the process comprising:
acquiring pieces of image data acquired by performing image reading in a sub scan direction in a unit of a line extending in a main scan direction;
changing an orientation of each of data images represented by the respective acquired pieces of image data; and
performing a plurality of image processing processes serially on the acquired pieces of image data every predetermined number of pieces of image data serving as a predetermined processing unit, wherein performing the plurality of image processing processes serially on the acquired pieces of image data includes:
changing the predetermined processing unit for the image processing processes to a processing unit different from the predetermined processing unit and performing a subsequent image processing process of the plurality of image processing processes before a previous image processing process of the plurality of image processing processes is complete when the orientation is changed, and
maintaining the predetermined processing unit for the image processing processes as the predetermined processing unit when the orientation is not changed, wherein
the image data includes at least one page of a document, a plurality of tiles are defined for each page of the document in the image data, and the orientation changing section changes the orientation of each of the data images using the tiles of the document as a processing unit.

* * * * *